May 22, 1962  W. B. LEAVENS  3,035,380
METHOD FOR INSPECTING CARTONS
Filed May 24, 1957  3 Sheets-Sheet 1
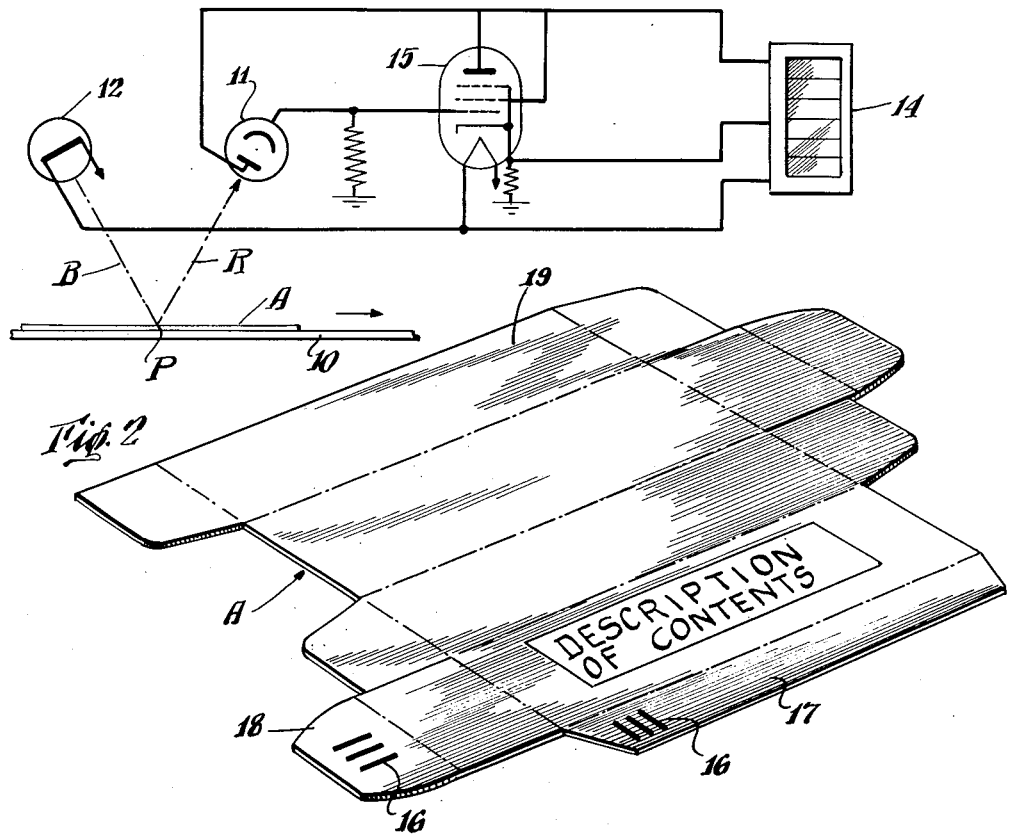
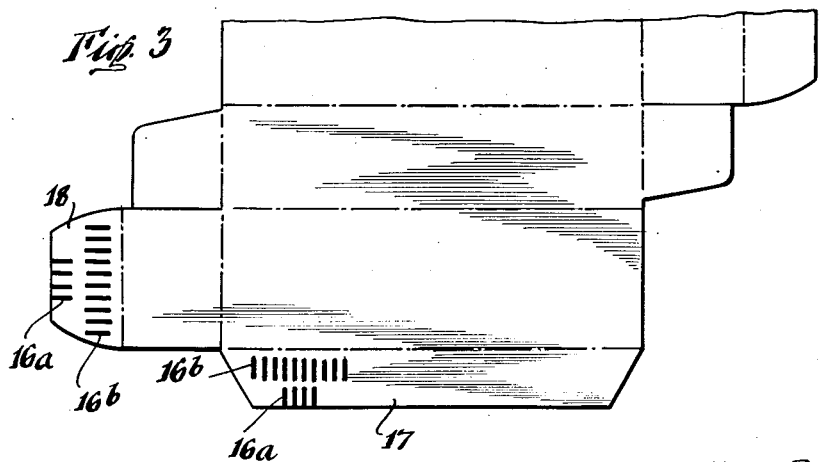
INVENTOR.
William B. Leavens
BY Leo C. Kraginski
ATTORNEY May 22, 1962   W. B. LEAVENS   3,035,380
METHOD FOR INSPECTING CARTONS
Filed May 24, 1957   3 Sheets-Sheet 2
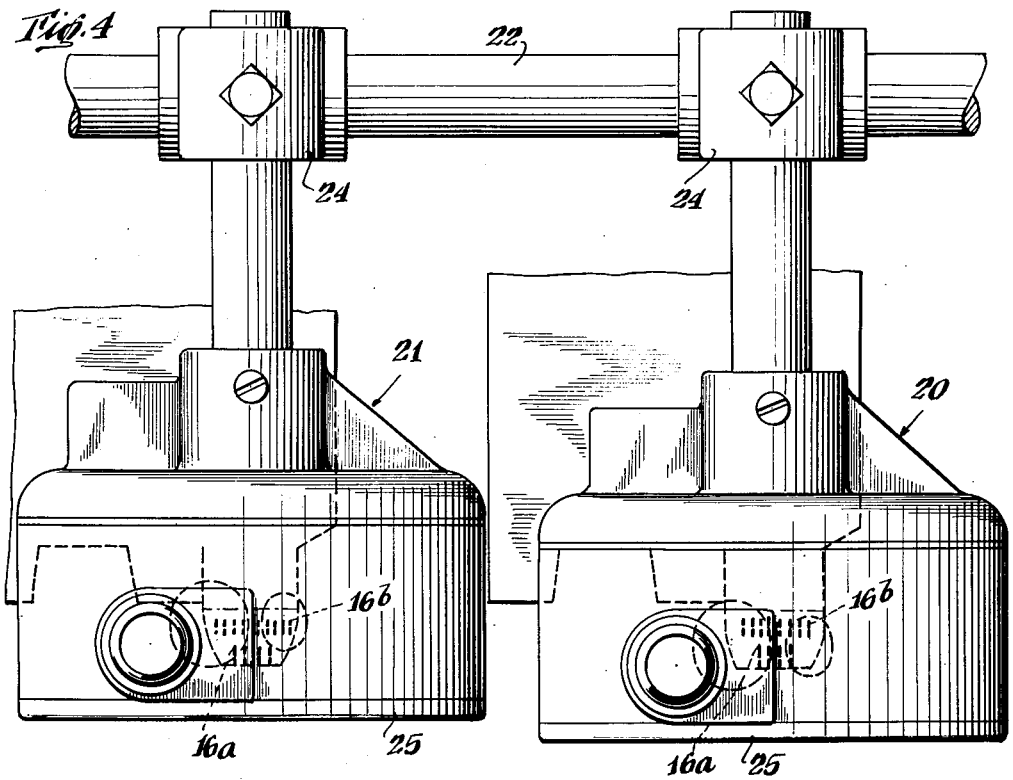
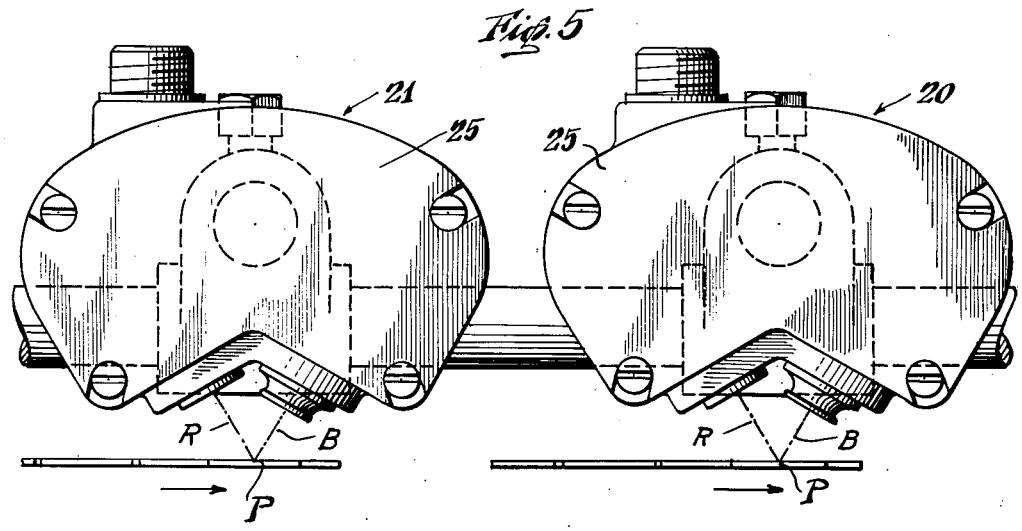
INVENTOR.
William B. Leavens
BY
Leo C. Krazinski
ATTORNEY United States Patent Office 3,035,380
Patented May 22, 1962

3,035,380
METHOD FOR INSPECTING CARTONS
William B. Leavens, Llewellyn Park, West Orange, N.J.
Filed May 24, 1957, Ser. No. 662,312
8 Claims. (Cl. 53—47)

The present invention relates to a method for determining whether or not a plurality of articles are of identical character and, more particularly, to such a method wherein the articles bear code marks which are photoelectrically inspected and electronically identified.

In the packaging of drugs or the like in cartons having printed matter thereon descriptive of the packaged item, it is quite common that a large number of various items are concurrently packaged in the same plant, and that all of the items and the cartons are so similar in general shape, size, and appearance whereby it is difficult to visually or mechanically determine with unfailing accuracy when an improper carton inadvertently gets into a packaging line.

The consequences of packaging an item in a carton which purports to contain another article are quite apparent. For example, should a sick person be administered a drug contained in a carton which describes another drug, serious illness may result.

Accordingly, an object of the present invention is to provide an improved system for coding such items as labels, boxes or cartons whereby the coded items can be read photo-electrically and items bearing code marks other than those selected will be rejected.

Another object is to provide such a method which is accurate and reliable and operates at high speeds.

Other and further objects will be obvious upon an understanding of the illustrative embodiment about to be described, or will be indicated in the appended claims, and various advantages not referred to herein will occurr to one skilled in the art upon employment of the invention in practice.

In accordance with the present invention, the foregoing objects are accomplished by apparatus for inspecting articles having code marks thereon consisting of a predetermined number of marks arranged in one or more rows on a contrasting surface, whereby alternate light and dark portions of different light reflecting values are provided, which apparatus comprises one or more light sensitive means focused on a point through which the respective rows of marks are to be passed; means for directing a beam of light on each of such points adapted to be reflected onto the light sensitive means by the light portions between the code marks to cause the light sensitive means to effect a signal, and an electronic counter electrically connected to the light sensitive means for responding to the signals effected thereby. The electronic counter is constructed and arranged to be reset within a predetermined time interval after being actuated but resetting thereof is prevented unless a predetermined number of signals has been counted. An article not bearing proper code marks will cause failure of resetting and is rejected by the counter.

In the drawings:

FIG. 1 is a schematic view of apparatus embodying the present invention including a diagram of the electrical connections.

FIG. 2 is a perspective view of an unfolded carton illustrating one form of code marks, that is, a single row of black lines on a white background.

FIG. 3 is a fragmentary plan view of an unfolded carton illustrating another form of code marks, that is, a double row of black lines on a white background.

FIG. 4 is a plan view of photoelectric units particularly adapted for inspecting the codes shown in FIG. 3.

FIG. 5 is a front elevational view of the units shown in FIG. 4.

Figure 6:
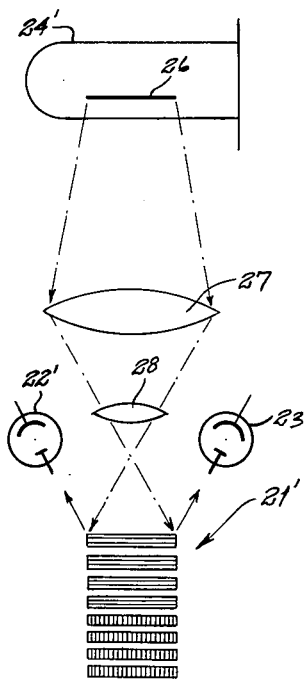
FIG. 6 is a schematic view of a pair of phototubes and a lamp for inspecting still another form of code marks, that is, a single row of colored lines, such as blue and red, on a white background.

Referring to the drawings in detail and more particularly to FIG. 1 thereof, code inspecting apparatus is shown which comprises means for providing an inspection zone, such as an endless belt conveyor 10 for moving articles A having code marks thereon through this zone; a photoelectric device including light sensitive means, such as a phototube 11, which is focused on a point P through which the articles are to be passed by the conveyor; a source of light, such as a lamp 12 having a filament, the reflected image of which is preferably of the same length and width as a code line, for directing a narrow light beam B on the point P, whereby portions of the code are adapted to reflect as a beam R onto the light sensitive means of the phototube 11; and an electronic counter 14 electrically connected to the photoelectric device for actuation thereby through a thermionic tube 15, which may be considered part of the photoelectric device and which is adapted to transmit impulses to the counter in response to signals produced by the phototube.

In FIG. 2, a blank or unfolded carton is shown by way of example as representing an article A having code marks thereon in the form of a predetermined number of spaced narrow stripes 16 arranged in a row both on a glue lap 17 of the carton and on an end flap or tuck 18 of the carton, preferably at the bottom thereof. The code marks on the glue lap can be utilized conveniently by the carton manufacturer in the inspection of the carton blanks to determine that all blanks in a particular lot bear identical code marks and corresponding identical printed matter describing the item of material to be contained within the carton. For example, the prevailing practice is to affix the lap 17 to the underside of the end panel 19, whereby the marks thereon are concealed, and to then ship the cartons in folded flat condition to the packer. Consequently, the packer in the inspection of the cartons prior to placing material therein must rely on the code marks on the tuck 18.

The system of coding illustrated in FIGS. 1–3 herein comprises applying a different given number of stripes or lines on cartons bearing different description. For example, dark stripes are applied on a white or lighter contrasting background, whereby the portion of the carton to be passed through the inspection point P has portions of different light reflecting values which cause the phototube to produce a signal each time the reflected beam is darkened by a stripe passing through the point P. These signals are transmitted to the counter 14, which determines the identity of the carton in the manner about to be described hereinafter.

This system of coding can be conveniently utilized where the packer handles only a small number of different items requiring careful inspection of their cartons. The coding then consists of using from one to about sixteen marks or stripes 16 on the tuck 18.

In order to practice the present invention in plants handling as many as two hundred twenty-five such items, the glue lap 17 and end flaps or tucks 18 are provided with stripes arranged in two or more rows, for example, in two rows 16a and 16b, as shown in FIG. 3. With this arrangement, if eight stripes are placed in each of the two rows, the coding system comprises sixty-four different combinations and, if fifteen stripes are placed in each of the two rows, the combinations increase to two hundred and twenty-five. Thus, by increasing the number of rows and stripes, more combinations can be provided.

In FIGS. 4 and 5, photoelectric scanning apparatus is illustrated for inspecting two rows of marks or stripes, such as shown in FIG. 3. This apparatus comprises two units 20 and 21, a supporting rod or bar 22 adjacent the conveyor, and clamps 24 for securing the units to the rod or bar 22 in a manner to locate the scanning elements thereof in offset relation, whereby the unit 20 is adapted to scan the row 16a and the unit 21 is adapted to scan the row 16b. Also, the clamps 24 permit adjustment of the units to scan cartons having the stripes located differently because of the size or dimensions of the cartons.

The units 20 and 21 each include a casing 25 which houses a phototube and a lamp and has phototube focusing and sight beam directing openings therein adapted to be positioned in close proximity to the surface of the carton passing through the inspection point P. Each of these units utilizes a circuit, such as shown in FIG. 1, to provide for independent actuation of counting means within the counter, such as a network for counting the stripes in row 16a, and a second network for counting the stripes in row 16b. These networks are so integrated that the desired number of combinations can be identified.

The counter 14 utilized herein is so constructed and arranged that it can be preset for a predetermined count corresponding to that to be given by the coding of cartons all properly belonging in a particular batch, which is to be packed for shipment by the carton manufacturer or is to be conveyed on the packaging machine. As such cartons pass through the inspection point, the coding is scanned and signals are produced by the phototube and transmitted to the counter. When the present count has been registered and the carton leaves the inspection point P, within a given time element means within the counter effect resetting thereof and the counter continues to function in response to the carton next in line on the conveyor. For example, the reset is cocked by the first impulse generated when the carton enters the point P. When a line is crossed, a time delay starts the uncocking but because the interval is short the reset is immediately recocked by the next white space. When the carton leaves P, the interval is great during which time the trigger becomes uncocked before the next carton enters the field. The completion of this uncocking releases an impulse that acts through an electronic switch, (a) to reset the counter if the switch has been set by a proper count or (b) to actuate an alarm relay if the switch has not been so thrown.

In the event the coding on the carton does not effect registry of the proper count, means within the counter prevent functioning of the resetting means and instead actuate means for rejecting the carton, which is not coded for the present count, and therefore does not belong in the batch being inspected. The rejecting means may be in the form of a visual, audible, or electrical signal, with or without stoppage of the conveyor and counter, which advises an operator that a carton should be removed, or may include an automatic device which removes the undesired carton from the conveyor and, after having so functioned, clears the counter for the scanning of the next carton.

Referring now to FIG. 6, there is shown another embodiment for inspecting a single row of colored code stripes or lines 21'. As described hereinbefore with respect to FIGS. 1-3, two hundred and twenty-five combinations can be obtained with two rows of spaced black stripes having fifteen stripes per row. With a single row of fifteen black stripes placed on a glue lap, a maximum of fifteen combinations can be obtained. However, it has been discovered that the number of combinations for a single row of fifteen stripes can be considerably increased by utilizing multi colored stripes, so that such stripes, printed in two colors, can provide one hundred and five (105) combinations.

This is accomplished, as seen in FIG. 6, by using a combination scanner in which two phototubes 22', 23 are focused on the row of stripes 21', which are illumined by a single lamp 24' having a filament 26, the reflected image of which is preferably of length and width equal to the length of each stripe 21', the light rays from the lamp being focused through lenses 27 and 28, as is conventional. The phototubes are so selected that one thereof is most sensitive to darker colors, such as a #927 tube, while the other thereof, such as a #5583 tube, would read all colors. Thus, if the row included seven red stripes and four blue stripes, the #5583 phototube would read the total number of stripes, namely eleven, and would accordingly transmit eleven impulses to its associated counter over its particular channel in a manner similar to that described for FIG. 1. The other (#927) phototube would read the four blue (darker) lines only and these four impulses would be transmitted over a second channel to its associated counter.

The value of such an increased number of combinations is readily apparent. A particular advantage is gained in drug cartons where product identification in various languages is printed in one color and product strengths are printed in a second color.

Assuming that a fifteen (15) stripe, single row, two color code is desired, the one hundred and five (105) combinations are obtained by starting, for example, with the colors black and red. If one to fourteen black stripes and one red stripe are printed in a single row on the carton, fourteen different combinations can be obtained; next, if one to thirteen black stripes and two red stripes are printed, an additional thirteen combinations are obtained; and, if one to twelve black stripes and three red stripes are printed, a further additional twelve combinations are obtained. Therefore, continuing in descending order of black stripes until we have fourteen red stripes and one black stripe to provide an additional single combination, we can summarize the series of combinations as 14, 13, 12, 11, 10, 9, 8, 7, 6, 5, 4, 3, 2, and 1, which accumulate to a total of 105.

Assuming that a third color is required, then a stripe of said third color is printed and the remaining fourteen stripes are printed in the two color combinations explained in the preceding paragraph. With this three color arrangement ninety-one (91) combinations can be obtained, which is readily calculated by subtracting fourteen from the one hundred and five combinations obtained by using two colors. By using more than one stripe of the third color, three color code combinations are possible.

For a four color arrangement where two colors are separately coded, there are thirteen stripes for the two color combination, heretofore explained, which will permit seventy-eight (78) combinations. For five, six, etc. color arrangements the total combinations will decrease respectively by 12, 11, etc. As stated hereinbefore, the operation consists in reading the full code in all colors with one phototube (#5583) and by reading that part of the code having the dominant colors with the second phototube (#927).

It is to be noted, therefore, that with multi color reading three main advantages are obtained (1) a larger code requiring no additional space, (2) ability to code two colors and inspect them individually, and (3) quality control which insures presence of all colors reasonably in register. The last advantage is particularly important in connection with pharmaceutical cartons which usually are printed by several passes through printing presses rather than by a single pass through a multicolor press.

However, in the event that only one channel or phototube circuit is to be used for a single row of stripes 16, only fifteen combinations are possible, but color codes can be read in the manner described hereinbefore. For each color over the original color the code combinations are reduced by one. Thus for a two color arrangement, there would be printed one to fourteen stripes in the key color and one stripe for the other color; for a three color arrangement there would be printed one to thirteen stripes in the key color and one stripe each for the other two colors to total fifteen. Similarly for a four color arrangement there would be printed one to twelve stripes in the key color and one stripe each for the other three colors to total fifteen; etc.

Figure 7:
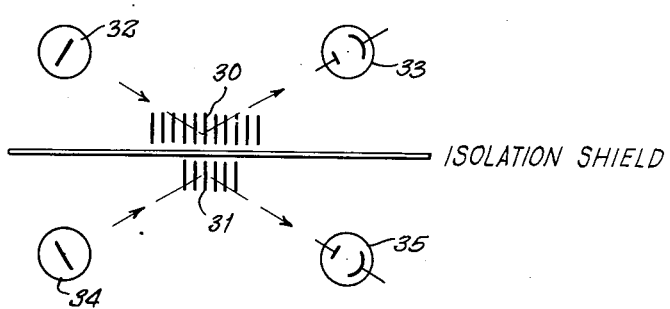
FIG. 7 is a schematic view of an arrangement for inspecting a double row of multi-colored code lines with a shield for separating the lines, each line of marks being inspected by a lamp and associated phototube.

In FIG. 7 there are shown a double row of stripes 30 and 31 adapted to be inspected by a lamp 32 and associated phototube 33 for the row containing stripes 30 and by a lamp 34 and associated phototube 35 for the row containing stripes 31. The stripes 30 and 31 are of course printed on cartons or the like, as explained hereinbefore, but are shown thus for simplicity. To enable each row to be read properly and without interference from the oppositely disposed lamps a vertical, longitudinal shield 37 is disposed between the rows of stripes 30 and 31.

With two rows of fifteen stripes each there are possible two hundred and twenty-five combinations (15×15=225). By printing one row in one color and the second row in another color, color inspection is possible with the ability also to read two hundred and twenty-five combinations. Where more than two colors are to be inspected, the total number of color combinations is reduced, as heretofore for the single row arrangement. For example, with a four color code two colors are selected as the code colors and the remaining two colors are represented by a single stripe for each color. The two latter colored stripes can be printed next to each other in one of the two rows, thereby providing one hundred ninety-five combinations (13×15=195), or each colored stripe can be placed in a separate row, one above the other, thereby providing one hundred ninety-six combinations (14×14=196). It is assumed that in the use of either choice above the color tube (#927 or #5583) will acceptably read the added line or lines.

From the foregoing description, it will be seen that the present invention provides an improved system for rapidly and reliably inspecting coding on many different types of articles to determine whether or not such articles belong in the batch being inspected.

As various changes may be made in the form, construction, and arrangement of the parts herein, without departing from the spirit and scope of the invention and without sacrificing any of its advantages, it is to be understood that all matters are to be interpreted as illustrative and not in any limiting sense.

This application is a continuation-in-part of copending application Serial No. 346,773, filed April 3, 1953, now abandoned.

What is claimed is:

1. The method of marking and inspecting articles which comprises placing a row of a predetermined number of spaced lines of at least two different colors on a panel of the article corresponding to a predetermined item of material, and electronically inspecting by reflected light said spaced lines twice by directly reading on the one hand all of said colored lines into one counter responsive to all of said colors and on the other hand at least one of said colored lines simultaneously into a second counter responsive only to one of said colors.

2. The method of marking and inspecting cartons to be folded which comprises placing a row of a predetermined number of spaced lines of at least two different colors and the same line thickness on a glue lap of the carton corresponding to a predetermined item of material, electronically inspecting by reflected light said predetermined number of spaced lines on the lap twice by directly reading on the one hand all of said colored lines into one counter responsive to all of said colors and on the other hand at least one of said colored lines simultaneously into a second counter responsive only to one of said colors, and gluing said lap to the carton whereby the lines on the lap are concealed.

3. The method of marking and inspecting cartons to be folded which comprises placing indicia on a glue lap and on a tuck of a blank of the carton, which lap and tuck are later concealed from view, checking at one inspection zone the indicia on the lap, gluing the lap to the body of the carton, checking at a second inspection zone the indicia on the tuck, placing material according to said tuck indicia in said carton, and sealing the carton.

4. The method of marking and inspecting cartons to be folded which comprises placing a row of a predetermined number of spaced lines on a glue lap and on a flap of a blank of the carton corresponding to a predetermined item of material, electronically inspecting at one inspection zone said predetermined number of spaced lines on the lap, gluing said lap to the carton whereby the lines thereon are concealed, inspecting at a second inspection zone the spaced lines on the flap, placing said predetermined item of material in said carton, and sealing said carton, whereby said flap is concealed from view.

5. The method of marking and inspecting cartons to be folded which comprises placing a single row of predetermined alternate lines and spaces of contrasting color on a glue flap, placing a double row of predetermined alternate lines and spaces of contrasting color on a tuck of the carton, said lines being of the same thickness, said single and double rows corresponding to a predetermined item of material to be packaged in said carton, electronically inspecting at one inspection zone said glue flap for registration of said lines thereon, gluing the flap to the carton, whereby said single row is concealed, and inspecting at a second inspection zone the tuck for registration of said lines thereon to assure that said carton so marked is to receive said item of material.

6. The method of marking cartons and controlling material packaged therein, which comprises placing certain indicia relating to a particular material to be packaged therein on a lap and on a flap of a blank of the carton, comparing at one inspection zone the indicia on the lap with a predetermined standard, gluing said lap to the carton when the standard is met, whereby the indicia on said lap is thus concealed, comparing at a second inspection zone the indicia on the flap with a second predetermined standard, and passing those cartons meeting the second standard to a filling machine for packing said particular material therein.

7. The method of marking cartons and controlling material packaged therein which comprises placing certain indicia relating to a particular material to be packaged therein on a lap and on a tuck of a blank of the carton, electronically comparing at one inspection zone the indicia on the lap with a predetermined standard, gluing said lap to the carton when the standard is met, whereby the indicia on said lap is thus concealed, electronically comparing at a second inspection zone the indicia on the tuck with a second predetermined standard, and passing those cartons meeting the second standard to a filling machine for packing said particular material therein.

8. The method of marking cartons and controlling material packaged therein which comprises placing a single row of predetermined alternate lines and spaces of contrasting color relating to a particular material to be packaged therein on a lap and on a tuck of a blank of the carton, said lines being of the same thickness, electronically inspecting at one inspection zone the lines on the lap for registration thereof with a predetermined standard, gluing said lap to the carton, whereby the lines on said lap are thus concealed, electronically inspecting at a second inspection zone the lines on the tuck for registration thereof with a second predetermined standard, adding said material to the carton when said second standard is met, and sealing the carton, whereby the tuck lines are concealed.

References Cited in the file of this patent

UNITED STATES PATENTS

| | | |
|---|---|---|
| 1,874,069 | Weigl | Aug. 30, 1932 |
| 2,127,028 | Hayssen | Aug. 16, 1938 |
| 2,224,646 | Friedman et al. | Dec. 10, 1940 |
| 2,268,498 | Bryce | Dec. 30, 1941 |
| 2,342,198 | Hultin | Feb. 22, 1944 |
| 2,362,004 | Heidinger | Nov. 7, 1944 |
| 2,524,029 | Carroll et al. | Oct. 30, 1950 |
| 2,551,364 | Coakley | May 1, 1951 |
| 2,609,928 | Doust | Sept. 9, 1952 |
| 2,612,994 | Woodland et al. | Oct. 7, 1952 |
| 2,719,629 | Robinson | Oct. 4, 1955 |
| 2,749,533 | Daniels | June 5, 1956 |
| 2,899,132 | Orthuber | Aug. 11, 1959 |